United States Patent [19]

Noble

[11] Patent Number: 4,968,209
[45] Date of Patent: Nov. 6, 1990

[54] AUTOMATED MATERIAL HANDLING SYSTEM FOR A CARGO TRAILER

[75] Inventor: William L. Noble, Village of Wolverine Lake, Mich.

[73] Assignee: Chrysler Corporation, Highland Park, Mich.

[21] Appl. No.: 375,084

[22] Filed: Jul. 3, 1989

[51] Int. Cl.⁵ .............................................. B65G 65/02
[52] U.S. Cl. ...................................... 414/343; 414/273; 414/347; 414/399; 414/608; 414/665; 414/785; 364/424.02; 180/169
[58] Field of Search ..................... 901/1; 414/281, 282, 414/343, 345, 347, 399, 665, 669, 622, 608, 630, 663, 785; 180/169; 293/102; 296/39.1, 181, 183; 235/375, 383; 364/424.02; 340/686

[56] References Cited

U.S. PATENT DOCUMENTS

| | | | |
|---|---|---|---|
| 3,295,881 | 1/1967 | Worthington | 414/343 X |
| 3,797,460 | 3/1974 | Blankenship | 414/608 X |
| 3,811,579 | 5/1974 | Black | 414/347 |
| 3,817,567 | 6/1974 | Lull | 414/622 X |
| 4,103,795 | 8/1978 | Miller | 414/347 X |
| 4,214,789 | 7/1980 | Katz et al. | 296/183 |
| 4,411,577 | 10/1983 | Shearer | 414/347 X |
| 4,538,953 | 9/1985 | Abramson | 414/622 X |
| 4,811,228 | 3/1989 | Hyyppä | 364/424.02 |

Primary Examiner—Frank E. Werner
Assistant Examiner—Keith L. Dixon
Attorney, Agent, or Firm—Edward A. Craig

[57] ABSTRACT

The invention relates to the provision of an automated material handling system for a cargo trailer which is integrated with an automated material handling system provided for a manufacturing assembly plant. The system for the cargo trailer includes a protective guard rail for bar-coded targets provided within the cargo trailer, modification of an automated lift truck which permits shifting of parts racks as they are loaded or unloaded from a cargo trailer and also exact positioning of parts racks with respect to an automated lift truck.

5 Claims, 5 Drawing Sheets

AUTOMATED MATERIAL HANDLING SYSTEM FOR A CARGO TRAILER

BACKGROUND OF THE INVENTION

1. Field of the Invention

The automated material handling system for a cargo trailer includes means to facilitate loading and unloading a cargo trailer which are integrated with automated material handling means provided on a loading dock.

2. Description of Related Art

Modern material handling systems increasingly utilize automated material handling equipment. This is particularly true in connection with automotive assembly operations. Increasingly, automotive assembly operations are utilizing what is referred to as "just-in-time" inventory control. As the term implies, this system has as an objective to delivery components to an automotive assembly plant as they are needed for assembly of vehicles. In the past, assembly plants have included large storage areas for storing large inventories of vehicle components which had been fabricated and shipped from remote manufacturing facilities. Not only does such an inventory system require that the assembly plant be provided with the storage area (which involves expensive initial construction, maintenance and utilities), such a system also requires the maintenance of a large parts and components inventory which is undesirable from a finance point of view.

However, "just-in-time" delivery of parts and components requires highly efficient assembly plant material handling techniques in order that cargo can be quickly and effectively removed from trucks and delivered to the point of use and also that empty shipping racks be removed from assembly areas and loaded onto cargo trailers in an efficient manner in view of the fact that storage space is severely limited under such a system.

One material handling system which has been in the process of implementation to achieve the desired ends above referred to involves the use of robotic lift trucks capable of moving cargo without human intervention. One useful technique involves a guidance system which operates with a combination of dead reckoning and laser guidance. This system does away with dependence on a fixed path (such as a buried wire) for robotic lift trucks. On-board computers are provided on the trucks. The trucks include sensors which work by triangulation from identifiable landmarks which are fixed in known positions within the area of operation. The landmarks are created by installing bar coded targets at convenient intervals throughout the operating area. Positions of these targets are accurately surveyed and the coordinates recorded in the system software. From information on the angle of the targets scanned, the on-board computer calculates the exact position of the vehicle by a process of triangulation.

The vehicle follows an assigned loading track. In accordance with the present invention, a similar loading track is assigned to the floor of a cargo trailer for integration into the main system. However, the restricted space available in cargo trailers, as opposed to the more roomy area available in an assembly plant, presents special problems. The present invention provides means for overcoming these problems.

SUMMARY OF THE INVENTION

The invention is related to an automated material handling system for a manufacturing assembly plant. A loading dock having a loading dock surface forms part of the assembly plant. A loading track is assigned to the loading dock surface. An automated lift truck is provided for following the loading track while it moves cargo. Means, including bar-coded targets, are provided for causing the lift truck to follow the loading The present invention is concerned with expanding the automated material handling system to include cargo trailers. The cargo trailers include a rear loading opening from which extends forwardly thereof a cargo support surface upon which is also assigned a loading track. The automated lift truck functions to load and unload parts racks out of and into the cargo trailer for use in the assembly plant.

The two loading tracks are aligned when the cargo trailer is in position for loading or unloading to facilitate such loading and unloading. Each cargo trailer has a pair of spaced apart upstanding sidewalls. A plurality of horizontally spaced apart bar-coded targets are mounted on each sidewall within the cargo trailer intermediate the upper and lower edges thereof.

The lift truck includes scanning means for reading the bar-coded targets and controlling its path of movement to constrain it to follow the assigned loading track on the cargo support surface. Each bar-coded target within the cargo trailer is substantially flat and thin. A guard rail is provided on each sidewall within the cargo trailer extending horizontally along the length of the cargo trailer. The guard rails are positioned above the bar-coded targets. The guard rails are thicker than the bar-coded targets to thereby prevent contact therewith by parts racks. The lift truck has a mast including carriage means for engaging a parts rack. The lift truck mast includes means for mounting the carriage which permit lateral shifting of the carriage to facilitate lateral shifting of a parts rack carried by the lift truck upon contact of the parts rack with a guard rail.

The mast carriage preferably includes a pair of spaced apart locating elements extending forwardly thereof. The parts racks have a wall including an upright member positioned centrally thereof. The locating elements are spaced apart a distance slightly greater than the width of the upright member. The lift truck is positioned with respect to the parts racks by advancing the lift truck toward a wall with the space between the locating elements in substantial alignment with the upright member until the upright member passes between the locating elements. A pair of parts rack grasping hooks are provided on the lift truck carriage extending forwardly thereof. A hook is positioned laterally outwardly of each locating element. The parts rack wall has a crossmember extending past the upright member. The hooks are adapted to engage the crossmember after the locating elements have positioned the lift truck with respect to the parts rack.

Preferably, the bar-coded targets on the cargo trailer walls are spaced apart a distance of from about nine to ten feet. The bar-coded target on each sidewall of the cargo trailer closest to the rear loading opening is far enough distant from the opening to not effect the path of movement of the lift truck as the lift truck enters or leaves the cargo trailer.

IN THE DRAWINGS

DETAILED DESCRIPTION OF A PREFERRED EMBODIMENT

Figure 1:
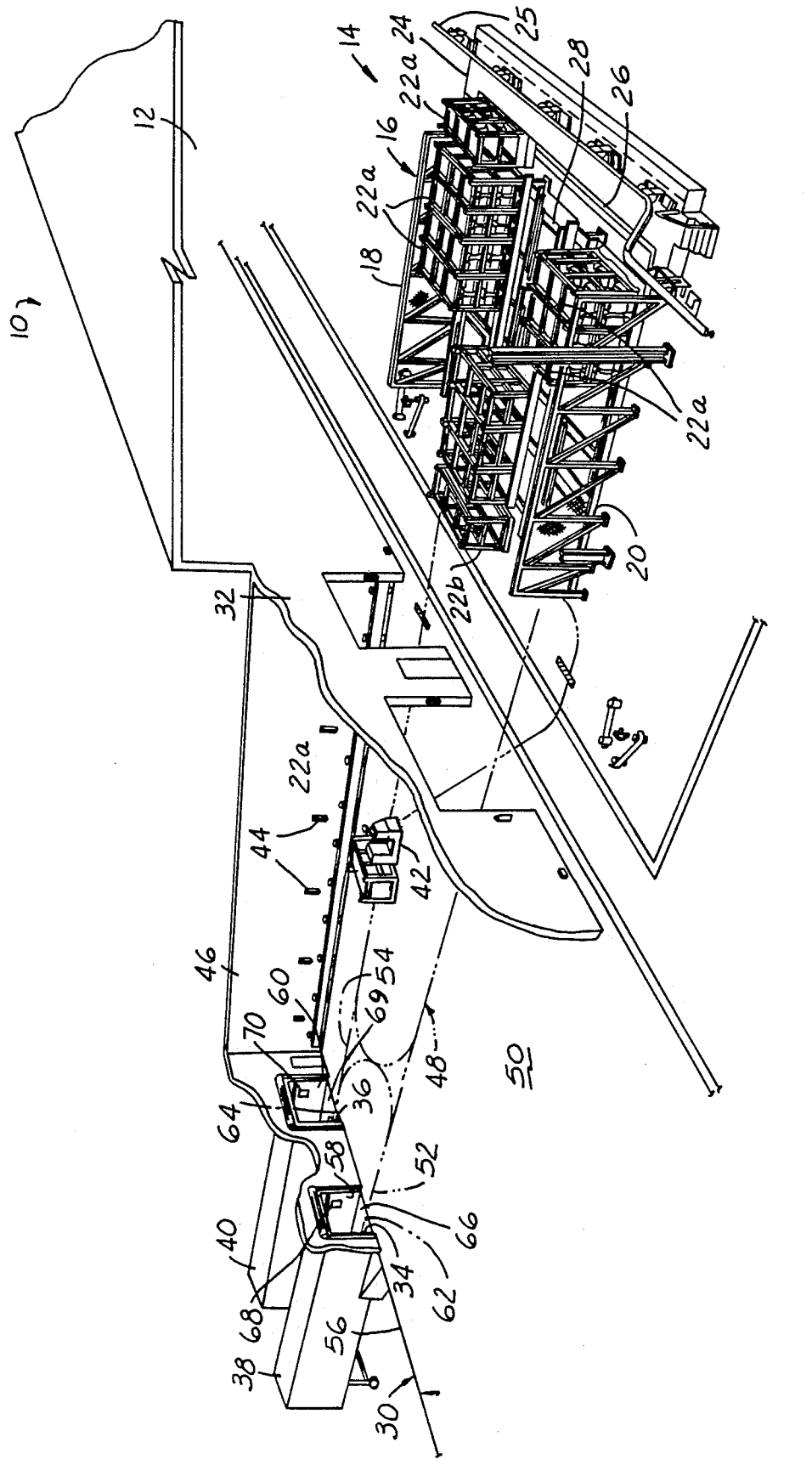
FIG. 1 is a view in perspective of a portion of a vehicle assembly plant including a loading dock with two cargo trailers in position with respect thereto.
Figure 2:
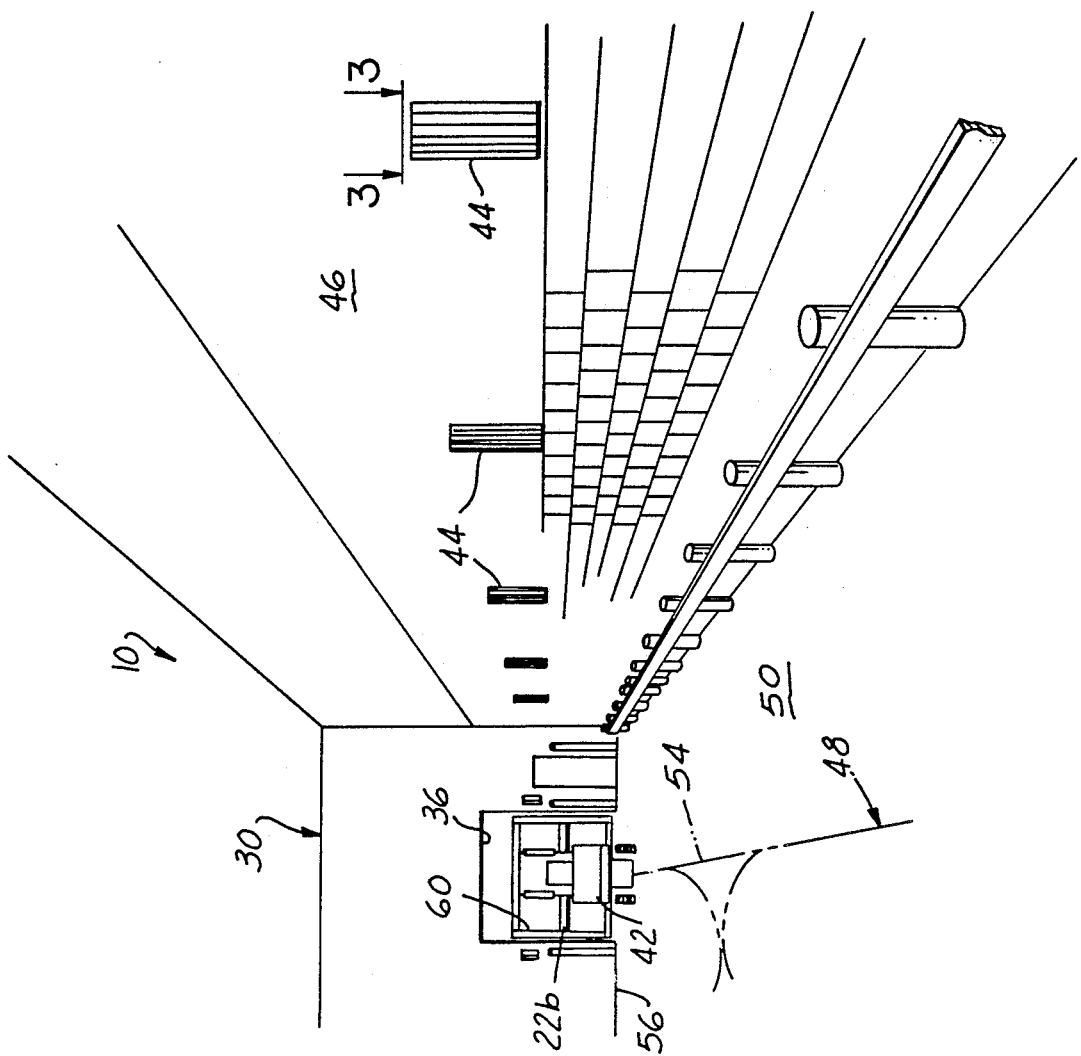
FIG. 2 is a perspective view similar to FIG. 1 illustrating the loading dock area.

The environment in which the cargo trailer material handling means of the present invention is used is illustrated in FIGS. 1 and 2. As will therein be noted, a vehicle assembly plant 10 has an interior space 12 within which is located an assembly work station 14. The work station 14 includes a rack storage structure 16. The structure 16 includes a pair of spaced apart rack receiving structures 18, 20 which function to receive loaded racks 22a and convey these racks towards a platform 24 as needed. Assembly operators are stationed on the platform 24 for unloading vehicle components from a loaded rack 22a positioned by the structure for such unloading. The racks illustrated are, for example, adapted to carry vehicle seats. The assembly operators remove seats from the rack and place them on a seat delivery conveyor 25 which takes them to a point of use for mounting in a vehicle. A rack transfer structure 26 is provided for receiving racks and moving the racks after they have been unloaded. A central rack receiving structure 28 is provided between the structures 18, 20 for receiving empty racks 22b which are conveyed rearwardly of the structure 28.

Figure 3:
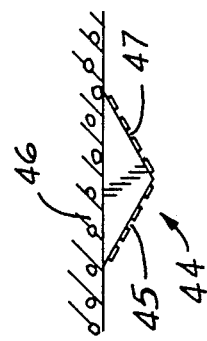
FIG. 3 is a sectional view taken substantially along the line 3—3 of FIG. 2 looking in the direction of the arrows.

Racks are loaded and unloaded from the work station racks storage structure 16 from a loading dock 30 which is separated from the space 12 by a wall 32. The loading dock 30 illustratively has two bays 34, 36 from which racks can be loaded or unloaded from cargo trailers 38, 40 which are backed up to the bays. The means for transporting loaded and unloaded racks comprise a lift truck 42. The lift truck 42 is controlled by means of a computer programmed dead reckoning system and by means of a series of bar-coded targets 44 mounted on the wall 46 of the loading dock. The lift truck 42 includes on-board computer means and scanning means 43 for relating to the targets 44 which result in the guidance system. As will be noted in FIG. 3, the targets 44 are V-shaped and present two surfaces 45, 47 which extend outwardly from the wall 46 to permit easy reading by the scanners regardless of which direction the lift truck 42 is traveling. The guidance system defines an assigned loading track complex 48 on the floor surface 50 of the loading dock and assembly area. The self-guided vehicle system and automated lift trucks of the type contemplated for use in the present invention may be models ARC or ARL available from Caterpillar Tractor Co. Elements 52, 54 of the loading track complex extend to the outer edge 56 of the loading dock. The elements 52, 54 are so positioned as to cause the lift truck 42 to enter the rear loading openings 58, 60 of the cargo trailers 38, 40. The lift truck can unload loaded racks 22a and load unloaded racks 22b into the cargo trailers.

The cargo trailers are also provided with assigned loading tracks 62, 64 on the cargo support surfaces 66, 69 which extend forwardly of the cargo trailers from the rear thereof. Bar-coded targets 68, 70 are provided on the upstanding sidewalls 72, 74 of the cargo trailers to define the loading tracks. These targets work in the manner of the targets 44. However, it will be noted in FIGS. 4 and 5 that the targets 68, 70 are substantially flat and thin. Outwardly extending V-shaped targets, such as the targets 44, are not used because of the space limitations of a cargo trailer. Therefore, about twice as many targets are used per lineal foot of the trailer to facilitate scanning of the targets. Preferably, the targets 68, 70 are spaced apart about nine to ten feet. Also, it will be noted that no targets are provided at the trailer opening 60 of trailer 40. The bar-coded target 68, 70 on each sidewall 72, 74 of the cargo trailer closest to the rear loading opening 60 is far enough distant from the opening to not affect the path of movement of the lift truck as the lift truck enters or leaves the cargo trailer. The reason for this is that there may be a crack or bump at the juncture of the loading dock and trailer which could cause oversteering if the lift truck direction were changed at that point.

In order for this system to function properly, it is necessary to align the cargo trailers 38, 40 with the bays 34, 36 in such a manner to result in alignment of the loading dock tracks 52, 54 with the tracks 62, 64 of the cargo trailers as shown. The racks are frequently almost as large as the distance between the sidewalls of the trailers, thus not permitting very much deviation and requiring that the lift truck follow a exact path for proper loading and unloading.

A standard automated lift truck 42 has been modified in order to enhance its ability to load and unload parts racks from a trailer 40. The modification is illustrated in FIGS. 6-11. As will be noted in FIG. 6, the lift truck 42 has the usual mast 76. The mast 76 is operated to move up and down by conventional mechanism. In practice, the mast 76 is lowered in order to engage a parts rack and is raised once the parts rack has been engaged to lift the parts rack off the ground for transportation. The modification involves providing a carriage 78 on the mast 76. As will be noted in FIGS. 8 and 9, the carriage 78 is attached to the mast 76 by means of a pair of arms 80, 82. The upper ends of the arms are pivotally attached to the mast 76 at 84, 86 while the lower ends of the arms are pivotally attached to the carriage 78 at 88, 90. This arrangement permits lateral swinging of the carriage 78 with respect to the mast 76 in a pendulumtype action. The carriage 78 may be shifted laterally in either direction a distance of about four inches. Guide cross members 92, 94 are provided on the mast 76. Bracket structures 96, 98 and 100, 102 are provided on the carriage 78 to cooperate with the guides 92, 94 to limit fore and aft movement of the carriage 78 with respect to the mast 76.

The swinging motion thus provided for the carriage 78 comes into play in the event that a parts rack carried by the carriage bumps into a fixed object. This small movement provided by the carriage permits continued travel of the lift truck even if it contacts a fixed structure. Such contact is most likely to occur within the cargo trailer 40.

Figure 4:
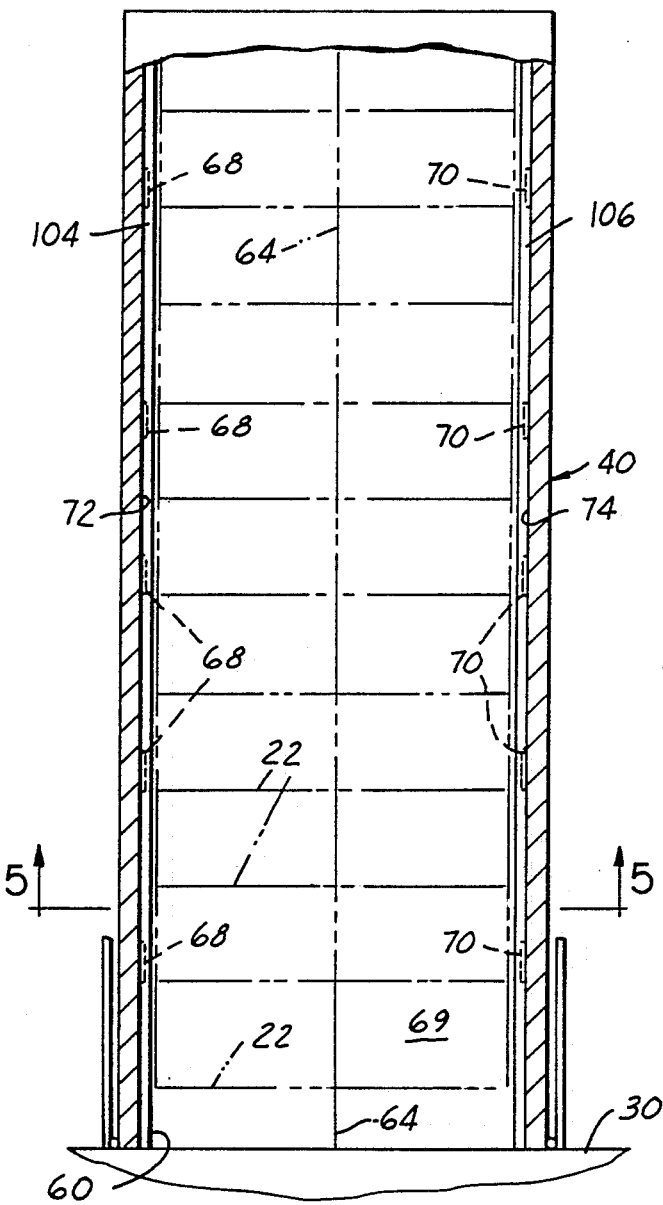
FIG. 4 is a plan view of a cargo trailer with the roof removed for the purpose of clarity.
Figure 5:
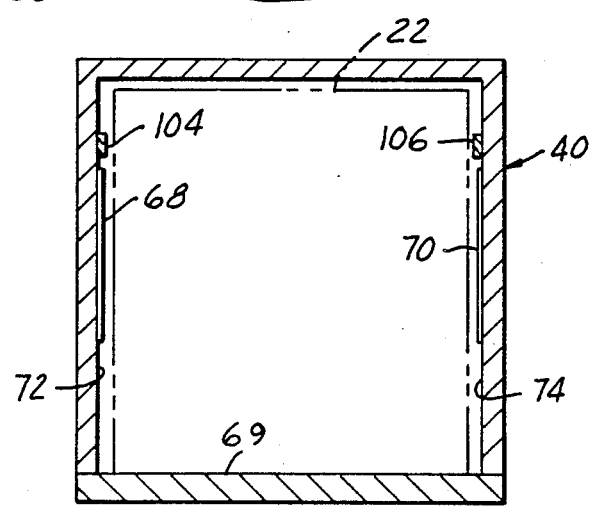
FIG. 5 is a sectional view taken substantially along the line 5—5 of FIG. 4 looking in the direction of the arrows.
Figure 6:
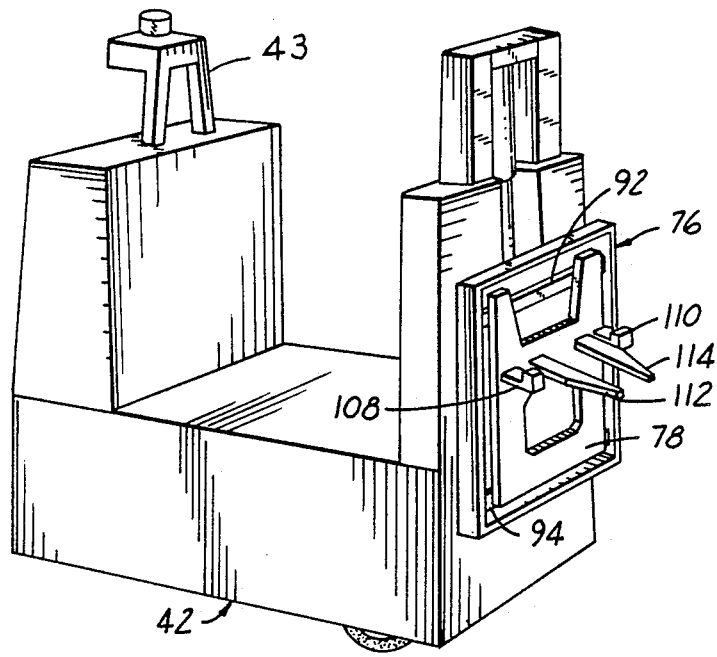
FIG. 6 is a view in perspective of an automated lift truck used in the present invention.

Referring to FIGS. 4 and 5, it will be noted that a guard rail 104, 106 is provided on each sidewall 72, 74 within the cargo trailer 40 extending horizontally along the length of the cargo trailer. The guard rails 104, 106 are positioned above the plurality of horizontally spaced apart bar-coded targets 68, 70 which are mounted on each sidewall within the cargo trailer intermediate the upper and lower edges thereof. The guard rails 104, 106 are thicker than the bar-coded targets 68, 70 to thereby prevent contact therewith by parts racks. When the lift truck 42 enters the cargo trailer 40, it is possible for the parts rack to impinge upon one of the guard rails 104, 106. As will be noted in dotted lines in FIGS. 4 and 5, there is very little space between the sidewall 72, 74 and the outer edges of the parts racks 22 which are illustrated in dotted lines. A slight deviation in the path of the lift truck 42 could cause such impingement. However, more commonly, such impingement occurs as the result of the cargo trailer sidewalls 72, 74 being slanted one way or the other to result in the interior space of the cargo trailer not being exactly rectangular. Trailer sidewalls are sometimes canted after the trailer has been subjected to the rigors of ordinary use. If contact is made with the guard rails, the lateral shifting permitted by the carriage 78 is sufficient to permit loading and unloading of racks.

The lift truck 42 has also been modified in another respect. As will be noted in FIGS. 6 and 7, 10 and 11, instead of the mast 76 being provided with the usual fork for lifting a rack, it is provided with a pair of parts rack grasping hooks 108, 110 on the lift truck carriage 78. The hooks 108, 110 extend forwardly of the carriage 78. Additionally, a pair of spaced apart locating elements 112, 114 extend forwardly of the carriage 78. One hook 108, 110 is positioned laterally outwardly of each locating element 112, 114, the hook 108 being positioned outwardly of the locating element 112 and the hook 110 being positioned outwardly of the locating element 114.

The parts racks 22 have a wall 116 including an upright member 118 positioned centrally thereof. The racks 22 are longer than they are wide and are loaded longways as will be noted in FIG. 4. The locating elements 112, 114 are spaced apart a distance slightly greater and the width of the upright member 118. When it is desired to engage a rack 22, the lift truck 42 is positioned with respect to the parts rack by advancing the lift truck towards the wall 116 with the space between the locating elements 112, 114 in substantial alignment with the upright member 118 until the upright member passes between the locating elements as, illustrated in FIGS. 7 and 11. At this time, the lift truck 22 is properly positioned with respect to the parts rack. This arrangement facilitates conveying the racks in the desired pattern and depositing them at an exact desired location. This feature is of particular importance with respect to loading and unloading racks from the confined space of a cargo trailer 40.

Figure 7:
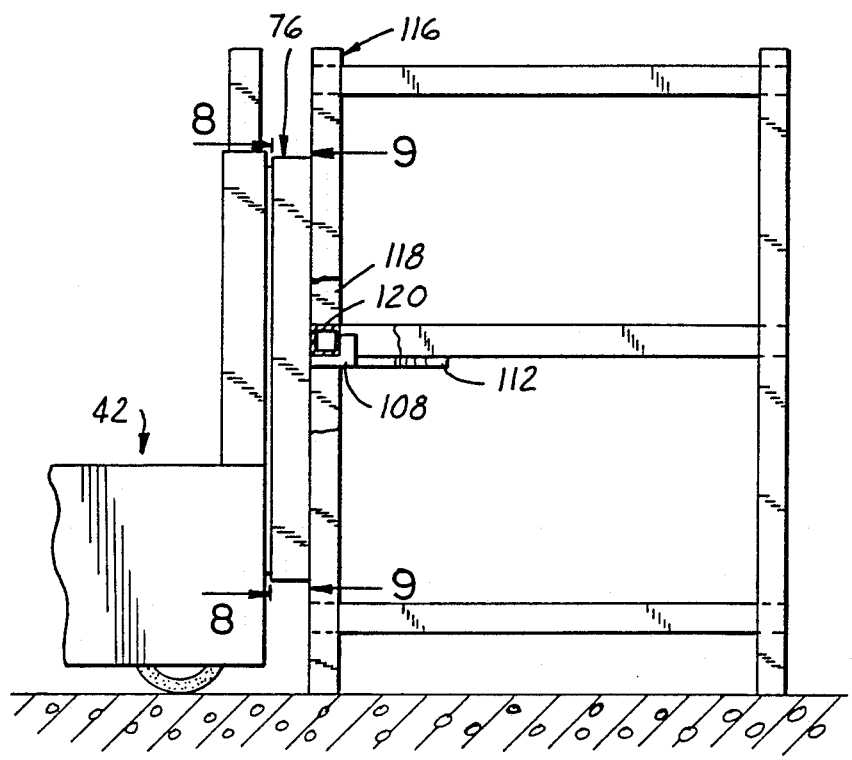
FIG. 7 is a side elevational view illustrating the lift truck of FIG. 6 engaging a parts rack.
Figure 8:
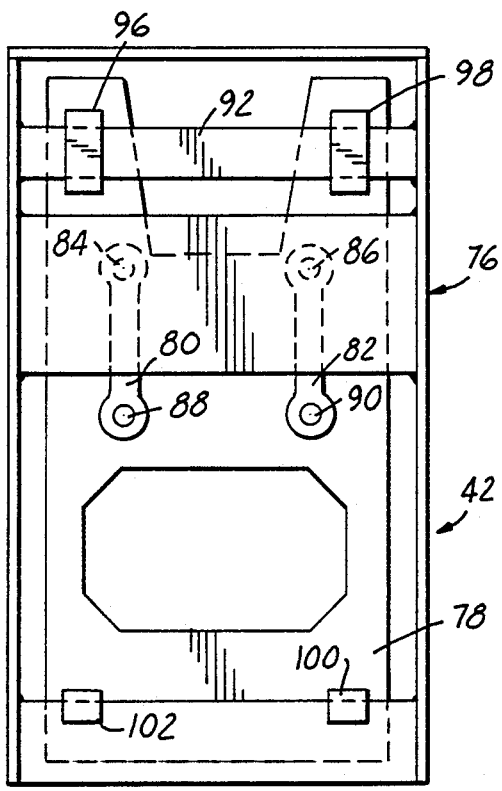
FIG. 8 is a sectional view taken substantially along the line 8—8 of FIG. 7 looking in the direction of the arrows.
Figure 9:
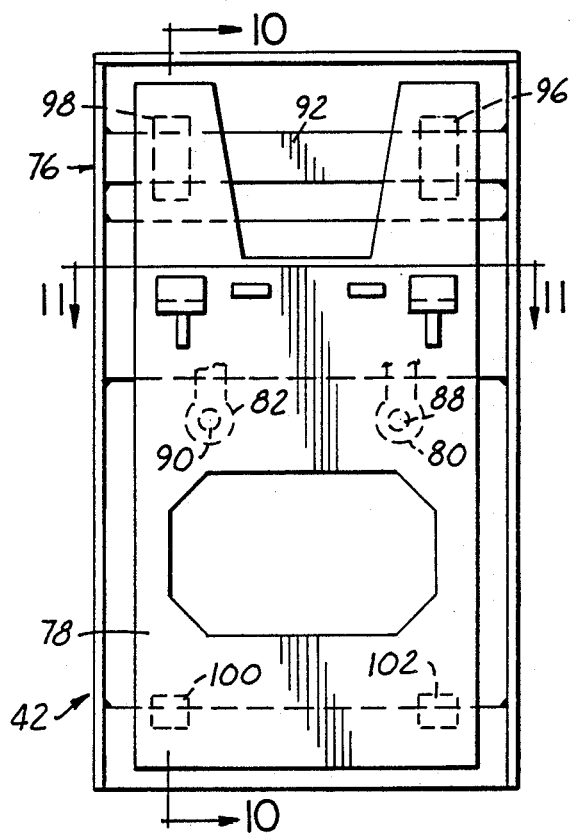
FIG. 9 is a sectional view taken substantially along the line 9—9 of FIG. 7 looking in the direction of the arrows.
Figure 10:
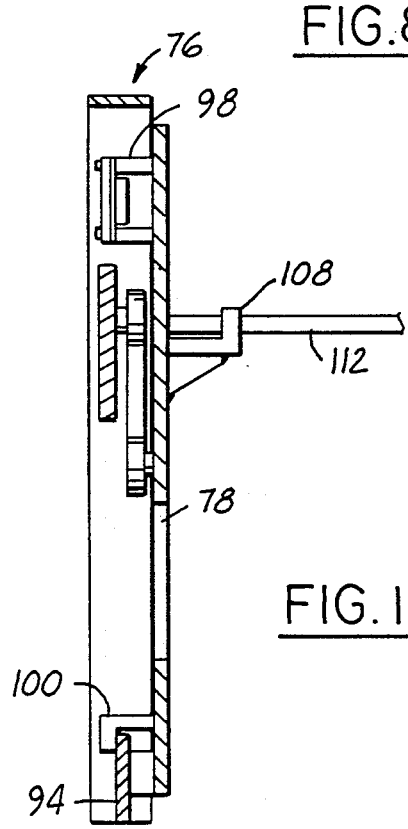
FIG. 10 is a sectional view taken substantially along the line 10—10 of FIG. 9 looking in the direction of the arrows.
Figure 11:
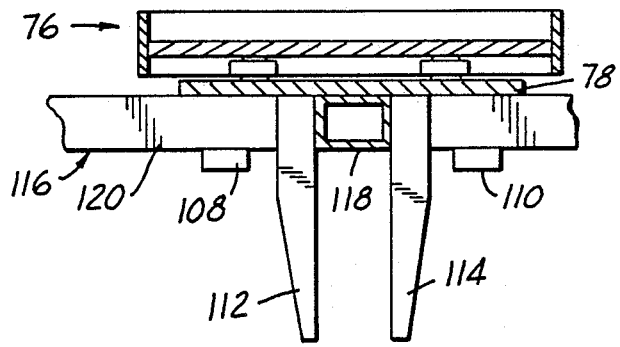
FIG. 11 is a sectional view taken substantially along the line 11—11 of FIG. 9 looking in the direction of the arrows.

The parts rack also has a crossmember 120 which extends past the upright member 118 as will be noted in FIGS. 7 and 11. The hooks 108, 110 are adapted to engage the crossmember 120 after the locating elements 112, 114 have positioned the lift truck 42 with respect to the parts rack. The mast 76 is moved upwardly whereupon the hooks 108, 110 firmly engage the cross member 120. The wall 116 of the parts rack is flush against the carriage 78. This arrangement prevents tilting of the parts rack when it is lifted. The use of hooks 108, 110 is advantageous in that it ensures the position of the parts rack 22 with respect to the lift truck.

I claim:

1. In an automated material handling system for a manufacturing assembly plant including a loading dock surface upon which is assigned a loading track, an automated lift truck, means including bar coded targets for causing the lift truck to follow the loading track, the improvement comprising a cargo trailer including a rear loading opening from which extends forwardly of the cargo trailer a cargo support surface upon which is assigned a loading track, the automated lift truck functioning to load and unload parts racks out of and into the cargo trailer for use in the assembly plant, the two loading tracks being aligned to facilitate such unloading and loading, the cargo trailer having a pair of spaced apart upstanding sidewalls, a plurality of horizontally spaced apart bar coded targets mounted on each sidewall within the cargo trailer intermediate the upper and lower edges thereof, the lift truck including scanning means for reading the bar coded targets and controlling its path of movement to constrain it to follow the assigned loading track on the cargo support surface, each bar coded target within the cargo trailer being substantially flat and thin, a guard rail provided on each sidewall within the cargo trailer extending horizontally along the length of the cargo trailer, the guard rails being positioned above the bar coded targets but below the upper edges of the sidewalls, the guard rails being thicker than the bar coded targets to thereby prevent contact therewith by parts racks, the lift truck having a mast including carriage means for engaging a parts rack, the lift truck mast including means for pivotally mounting the carriage to permit lateral shifting of the carriage to facilitate lateral shifting of a parts rack carried thereon upon contact of the parts rack with a guard rail.

2. A system as defined in claim 1, further characterized in that the lift truck mast carriage includes a pair of spaced apart locating elements extending forwardly thereof, the parts racks have a wall including an upright member positioned centrally thereof, the locating elements being spaced apart a distance slightly greater than width of the upright member, the lift truck being positioned with respect to the parts racks by advancing the lift truck towards said wall with the space between the locating elements in substantial alignment with the upright member until the upright member passes between the locating elements.

3. A system as defined in claim 2, further characterized in the provision of a pair of parts rack grasping hooks on the lift truck carriage extending forwardly thereof for lifting a parts rack, one hook being positioned laterally outwardly of each locating element, the parts rack wall having a crossmember extending past the upright member, the hooks adapted to engage the crossmember after the locating elements have positioned the lift truck with respect to the parts rack and to subsequently lift the parts rack.

4. A system as defined in claim 1, further characterized in that the bar coded targets are spaced apart a distance of from about nine to ten feet.

5. A system as defined in claim 1, further characterized in that the bar coded target on each sidewall of the cargo trailer closest to the rear loading opening is far enough distant from the opening to not affect the path of movement of the lift truck as the lift truck enters or leaves the cargo trailer.

* * * * *